Dec. 17, 1940.  W. S. GOERTZEN  2,225,214
FISHING BOB
Filed July 10, 1939

INVENTOR.
WILLIAM S. GOERTZEN
BY U. G. Charles
ATTORNEY.

Patented Dec. 17, 1940

2,225,214

UNITED STATES PATENT OFFICE 2,225,214

FISHING BOB

William S. Goertzen, Newton, Kans.

Application July 10, 1939, Serial No. 283,643

1 Claim. (Cl. 43—17)

My invention relates to improvements in a fishing bob. One object of my invention is to provide an air pocket concentrically positioned in the body of the bob to increase buoyancy of the body, said body being of buoyant substance of fibrous nature.

Another object of this invention is to provide a simple and efficient means to carry a battery axial in the body and means to separate said body intermediate of its length as accessible means to the battery and lamp.

A still further object of my invention is to provide a bail having a medially wound coil at the diametrical axis of the bob to receive a fishing line that is frictionally retained between the convolutions of the coil, and the legs of the bail each being secured to the body of the bob at its diametrical axis, the apex of the bail being outward and axial with said body while the other end of the bob has an eye secured thereto and axially extending through which a fishing line will slideably engage.

A still further object of my invention is to provide a resilient switch arm having one of its ends secured to the bob on one side circumferentially and extending thereacross, passing through the bail and terminating at the other side of the bob where it is free to rock toward and from the bob body, said arm having means on its free end to frictionally retain a fishing line as actuating means for the movement of said arm to make and break an electric circuit.

These and other objects will hereinafter be more fully explained, reference being had to the accompanying drawing forming a part of this specification, in which like characters will apply to like parts in the different views.

Referring to the drawing.

Figure 1:
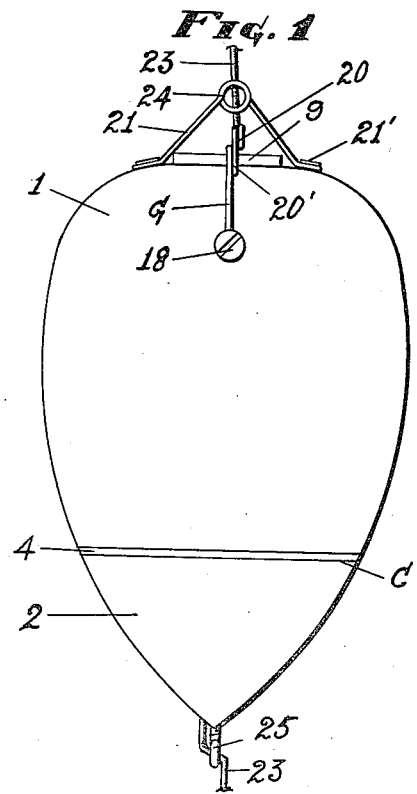
Fig. 1 is a side view of the bob.
Figure 2:
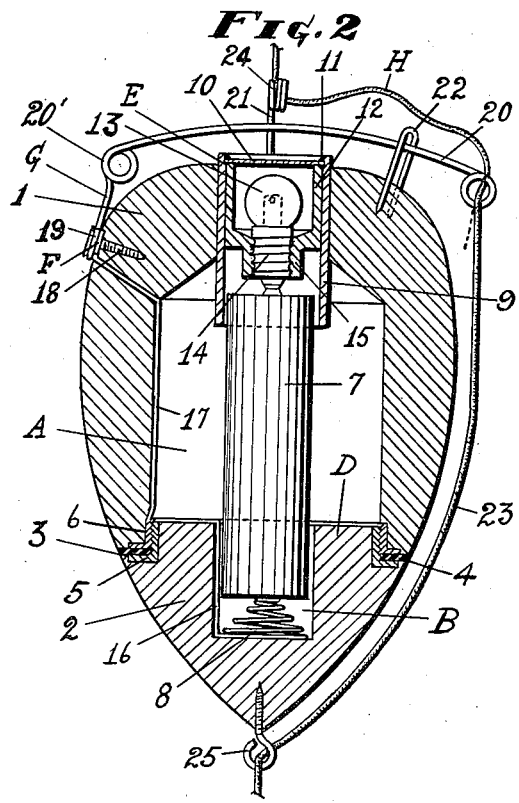
Fig. 2 is a longitudinal sectional view through the body of the bob.
Figure 3:
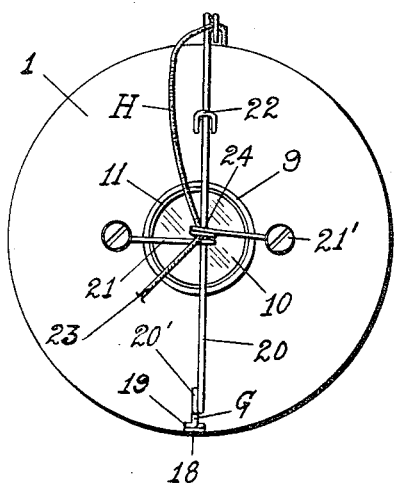
Fig. 3 is a top end view of the bob.
Figure 4:
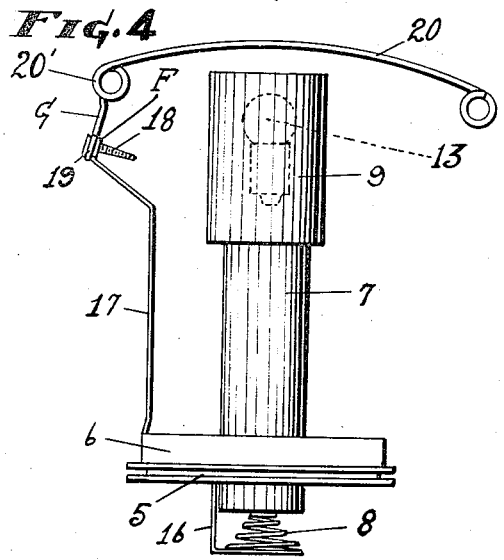
Fig. 4 is a diagrammatical view of the current conducting arrangement for the bob lamp.

The invention herein disclosed consists of body portions 1 and 2, respectively, portion 1 being hollow concentric to the body as at A, the said body portions being axially bored entering portion 1 at its upper end and terminating a spaced distance inward from the lower end of portion 2 as at B for the purpose later described. Portion 2 is removably arranged, the joint being as at C and having a shoulder 3 on which will seat a gasket 4 as fluid tight sealing means for the joint when tensioned thereon by threaded engagement through the medium of a threaded collar 5 secured to the upper extension D of portion 2 and adapted to engage with a similar collar 6 that is secured adjacent the open end of body portion 1 internally. Being so arranged, said portions are threadedly engaged as accessible means to a battery 7, the lower end of which is positioned in the bore portion B and seated on a helical spring 8 that is carried in the bottom of said bore B. The upper end of said battery is supported by its extension into the lower end of a sleeve 9 fitting tightly in the axial bore of body portion 1, extending slightly outward therethrough and being closed by a disc element 10 that is translucent, said element resting on a shoulder E that is spaced inward a short distance from the outer end of the sleeve and secured by plastic substance 11 extending therearound as fluid tight sealing means for the disc element.

Positioned in the sleeve is a lamp socket 12 fitting closely but being removable from the sleeve and having a lamp 13 provided with a base 14 that threadedly engages through neck 15 of the socket, the lower end of said base being directed toward a metallic center of the battery so that an electrode from the lamp will contact with the said metallic center.

As a means to close the circuit between the battery and lamp is through the medium of a wire 16 having one end thereof secured to the helical spring and extending upward and outward connecting with collar 5 and from thence transmitting through collar 6 to another wire 17 that is secured to said collar 6, last said wire extending upward along the wall of the hollow and obliquely outward and having an eye F to engage on the body of a screw 18 as binding means for said eye to another eye 19 positioned in like manner on the screw, last said eye being integral with a shank G of switch arm 20, said arm and shank being joined by a coil 20', and said arm extending across and through a bail 21 in spaced relation from sleeve 9, the legs of the bail being secured to the body of the bob by screw 21', substantially as shown, and said switch arm being retained against excess outward movement by a staple 22, the legs of which are driven into the body of the bob.

On the free end of said switch arm is a coil arranged by bending the same through which a fishing line 23 will extend and being retained at a selected point by frictional engagement between the convolutions of the coil, the said fishing line being likewise positioned and retained by a coil 24 at the apex of the bail; the line being thus secured is means to provide a slack portion as at H whereby the free end of the switch arm is permitted to move toward and from the bob body to contact with the outer extension of sleeve 9 as closing means for the circuit, illuminating the lamp, it being understood that the said line is free to slidably engage through a screw eye 25 axially carried at the lower end of body portion 2, the line extending downward so that a hook and sinker may be carried thereby at its lower extremity (the hook and sinker not shown in the drawing) and the circuit being closed by a jerk of a fish upon the hook whereby the switch arm is rocked in contact with the end of the sleeve illuminating the lamp which is observed by the fisherman during night or day fishing for a possible catch; in the event of a catch, the fish may be landed as the line is secured frictionally to the bail as heretofore described whereby tension of the line is relieved between the coil of the bail and the coil at the free end of the arm.

While I have shown a certain formed hollow in the body of the bob, the same may be comparatively enlarged by approaching the sides of the shell and the form of the bail and its manner of connection to the bob body may be varied, likewise the exact form of the switch arm and its method of connection to the current wire extending through the bob, and such other modifications may be made as lie within the scope of the appended claim.

Having fully described my invention what I claim as new and desire to secure by Letters Patent is:

In a fishing bob, a body, an electric illuminating means for the body, the body comprising an upper portion and a lower portion abutting at their adjoining ends, the upper portion being hollow and the lower portion having an inward extension entering a short distance into the hollow of the upper portion, a pair of threaded metallic collars, one of which is secured within the lower end of the hollow of said upper portion, the other collar being secured to the extension of the lower portion whereby said portions are threadedly secured together, a gasket between the abutting ends of said body portions as a fluid tight sealing means for the hollow of the upper portion, said upper portion having an axial bore communicating with the hollow, the lower portion having an axial bore projecting a short distance into its extension, a helical spring positioned in the bottom of said last named bore, a wire connecting the spring to the collar carried by the extension, a wire connected to the other collar said wire extending upwardly and outwardly through the wall of the upper portion of the body, a switch arm, means connecting one end of the arm to the outer extension of said wire, said means securing one end of the arm to said upper portion of the body, said arm extending diametrically across the upper end of said upper portion in spaced relation thereto, said arm having a coil wound on the free end thereof, means to guide and restrict the outward movement of the arm at its free end, a bail comprising a pair of legs, a coil wound medially of the ends of the legs, means to secure the legs to said upper portion of the body astride its bore, a shouldered sleeve fitting fluid tight in the bore of the upper body portion, said sleeve extending through the bore outwardly and into the said hollow a short distance, the shoulder being spaced a short distance inward from the upper or outer end of the sleeve, a translucent disc seating on the shoulder, means to secure the disc fluid tight on the shoulder, a lamp socket comprising a threaded neck and a tubular portion snugly but removably engaged in the sleeve, a lamp of a conventional type carried by the socket, and a battery seated on the helical spring, the other end of the battery being supported by the inner end of the sleeve in such a way as to illuminate the lamp when the circuit is closed by a downward rocking movement of the switch arm to contact with the outer end of said sleeve, all as and for the purpose specified.

WILLIAM S. GOERTZEN.